(12) United States Patent
Stephens et al.

(10) Patent No.: US 9,495,163 B2
(45) Date of Patent: *Nov. 15, 2016

(54) ADDRESS GENERATION IN A DATA PROCESSING APPARATUS

(71) Applicant: ARM Limited, Cambridge (GB)

(72) Inventors: Nigel John Stephens, London (GB); David James Seal, Cambridge (GB)

(73) Assignee: ARM Limited, Cambridge (GB)

( * ) Notice: Subject to any disclaimer, the term of this patent is extended or adjusted under 35 U.S.C. 154(b) by 29 days.

This patent is subject to a terminal disclaimer.

(21) Appl. No.: 14/573,193

(22) Filed: Dec. 17, 2014

(65) Prior Publication Data

US 2015/0106585 A1   Apr. 16, 2015

Related U.S. Application Data

(63) Continuation of application No. 13/361,229, filed on Jan. 30, 2012, now Pat. No. 8,954,711.

(30) Foreign Application Priority Data

Mar. 7, 2011   (GB) .................................. 1103823.9

(51) Int. Cl.
   *G06F 9/355*   (2006.01)
   *G06F 9/345*   (2006.01)
   (Continued)

(52) U.S. Cl.
   CPC ......... *G06F 9/3557* (2013.01); *G06F 9/30007* (2013.01); *G06F 9/30112* (2013.01); *G06F 9/30167* (2013.01); *G06F 9/342* (2013.01); *G06F 9/345* (2013.01); *G06F 12/109* (2013.01); *G06F 2212/657* (2013.01)

(58) Field of Classification Search
   None
   See application file for complete search history.

(56) References Cited

U.S. PATENT DOCUMENTS 4,385,352 A   5/1983   Bienvenu
4,453,212 A   6/1984   Gaither et al.
(Continued)

FOREIGN PATENT DOCUMENTS

EP   0 594 969   5/1994
EP   0 809 180   11/1997
(Continued)

OTHER PUBLICATIONS

Japanese Office Action issued Jul. 17, 2015 in JP 2013-557168 and partial English translation, 18 pages.
(Continued)

*Primary Examiner* — Kaushikkumar Patel
(74) *Attorney, Agent, or Firm* — Nixon & Vanderhye P.C.

(57) ABSTRACT

A data processing apparatus is provided comprising processing circuitry and an instruction decoder responsive to program instructions to control processing circuitry to perform the data processing. The instruction decoder is responsive to an address calculating instruction to perform an address calculating operation for calculating a partial address result from a non-fixed reference address and a partial offset value such that a full address specifying a memory location of an information entity is calculable from said partial address result using at least one supplementary program instruction. The partial offset value has a bit-width greater than or equal to said instruction size and is encoded within at least one partial offset field of said address calculating instruction. A corresponding data processing method, virtual machine and computer program product are also provided.

21 Claims, 14 Drawing Sheets

(51) Int. Cl.
*G06F 9/30* (2006.01)
*G06F 9/34* (2006.01)
*G06F 12/10* (2016.01)

(56) References Cited

U.S. PATENT DOCUMENTS

| | | | |
|---|---|---|---|
| 5,293,594 | A | 3/1994 | Nojiri et al. |
| 5,598,544 | A * | 1/1997 | Ohshima ............ G06F 9/30152 712/204 |
| 5,706,461 | A | 1/1998 | Branstad et al. |
| 5,787,495 | A | 7/1998 | Henry et al. |
| 5,924,128 | A | 7/1999 | Luick et al. |
| 6,009,510 | A | 12/1999 | Henry et al. |
| 6,189,086 | B1 * | 2/2001 | Yamaura ............ G06F 9/30149 711/214 |
| 2003/0163662 | A1 | 8/2003 | Glew et al. |
| 2004/0003199 | A1 | 1/2004 | May et al. |
| 2005/0228965 | A1 | 10/2005 | Sonzogni |
| 2010/0217958 | A1 * | 8/2010 | Symes ................ G06F 9/30036 712/208 |

FOREIGN PATENT DOCUMENTS

| | | |
|---|---|---|
| EP | 1 936 493 | 6/2008 |
| GB | 2 402 757 | 12/2004 |
| JP | 62-276633 | 12/1987 |
| JP | H10-91443 | 4/1998 |
| JP | 2006-527419 | 11/2006 |
| WO | WO 2008/122746 | 10/2008 |

OTHER PUBLICATIONS

M.J. Mahon et al, "Hewlett-Packard Precision Architecture: The Processor" *Hewlett-Packard Journal*, vol. 37, No. 8, Aug. 1986, 23 pages.
European Communication dated Aug. 20, 2014 in EP 12704438.6, 8 pages.
International Search Report and Written Opinion mailed Apr. 25, 2012 in PCT/GB2012/050158.
M.J. Mahon et al, "Hewlett-Packard Precision Architecture: The Processor" *Hewlett-Packard Journal*, vol. 37, No. 8, Aug. 1986, pp. 4-21.
UK Search Report for GB1103823.9, dated Jun. 28, 2011.
English translation of Chinese Second Office Action dated Mar. 9, 2016 issued in CN 201280012080.1, 5 pages.
Israeli Office Action issued Mar. 15, 2016 in IL 227486 and partial English translation, 7 pages.
English translation of Japanese Office Action mailed Jan. 12, 2016 in JP 2013-557168, 2 pages.

* cited by examiner

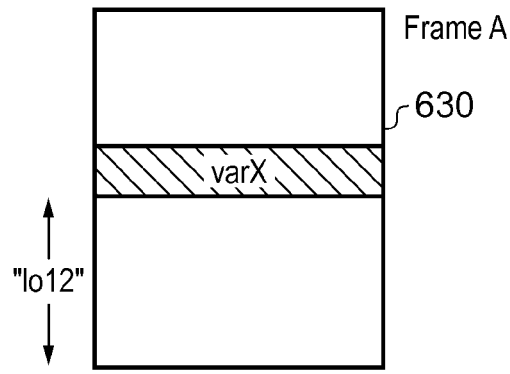
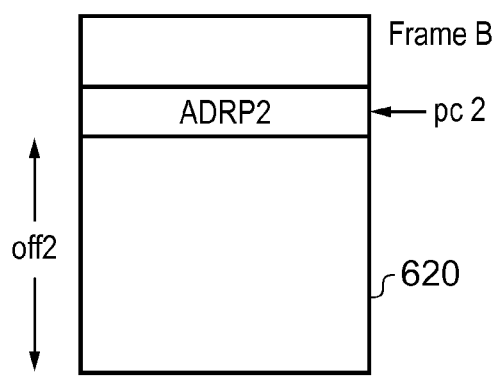
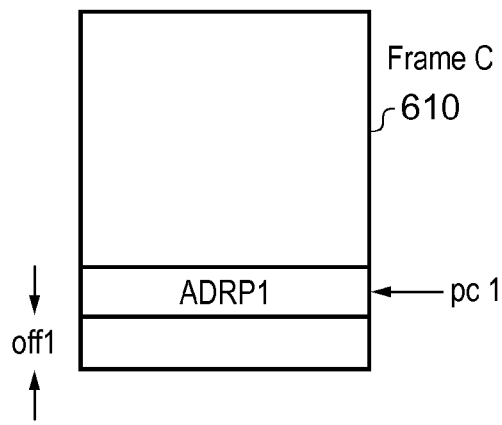
Example 1
ADRP  $X_d$, varX  //ADRP1
ADRP  $X_d$, varX  //ADRP2
LDR   $X_t$, [Xd,#:lo12:varX]
Example 2
ADRP  $X_d$, varX  //ADRP1
LDR   $X_t$, [$X_d$,#:lo12:varX]
INSTRN P
INSTRN Q
INSTRN R
STR   $X_t$, [$X_d$,#:lo12:varX]
FIG. 6

ADDRESS CALCULATING INSTRUCTON

Instruction class name: PC-relative addressing
Qualifier: ()
Instruction class ID: pcreladdr

Mnemonics (completed):

| Mnemonic | Qualifier | Syntax form | variant | Opcode op | Status | Description |
|---|---|---|---|---|---|---|
| ADR | (none) | only | 0 | 0 | Grn | Calculate the address of a PC-relative label. |
| ADRP | (none) | only | 1 | 1 | Grn | Calculate the address of the 4KB page containing a PC-relative label. |

Encoding:

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| op | immlo | 1 | 0 | 0 | 0 | 0 | | | | | immhi | | | | | | | | | | | | | | | | | Rd | | | |

710

Assembler syntax (only): <mnemonic> <Xd>, <label>
where:

<mnemonic>   Is one of the mnemonics listed above for the syntax form, and is encoded in the "op" field.
<Xd>         Is the destination 64-bit general register, encoded in the "Rd" field.
0    Is the label whose address is to be calculated. The offset is encoded in the "immhi" and "immlo" fields.
1    Is the label whose 4KB page address is to be calculated. The page offset is encoded in the "immhi" and "immlo" fields.

Pseudocode - decode part:

```
enumeration PCrelOp {PCrelOp_ADR, PCrelOp_ADRH};
opcode = if op == '0' then PCrelOp_ADR else PCrelOp_ADRH;
integer d = UInt(Rd);   if d == 31 then UNPREDICTABLE;
bits(64) imm64 = SignExtend(immhi:immlo, 64);
```

Pseudocode - execute part:

```
case opcode of
  when PCrelOp_ADR    result = PC + imm64;
  when PCrelOp_ADRH   result = (PC<63 : 12>:Zeros (12)) + LSL(imm64, 12);
x[d] = result;
```

Pseudocode notes: None.

FIG. 7

SUPPLEMENTARY INSTRUCTION - Option 1

Instruction class name: Add-subtract (immediate)
Qualifier:
Instruction class ID: addsub_imm Mnemonics (completed):

| Mnemonic | Qualifier | Syntax form | Opcode op:S:sf | shift | Registers Rd | Rn | Status | Description |
|---|---|---|---|---|---|---|---|---|
| - | - | - | xxx | 1x | - | - | Gm | UNDEFINED |
| ADD | wi | 32 | 000 | - | any | any | Gm | 32-bit addition Wd = Wn + shift(imm). |
| ADD | xi | 64 | 001 | - | any | any | Gm | 64-bit addition Xd = Xn + shift(imm). |
| CMN | wi | 32C | 010 | - | 11111 | any | Gm | 32-bit addition Wn + shift(imm), discarding the result, but setting the condition flags. |
| ADDS | wi | 32S | 010 | - | regno | any | Gm | 32-bit addition Wd = Wn + shift(imm), setting the condition flags. |
| CMN | xi | 64C | 011 | - | 11111 | any | Gm | 64-bit addition Xn + shift(imm), discarding the result, but setting the condition flags. |
| ADDS | xi | 64S | 011 | - | regno | any | Gm | 64-bit addition Xd = Xn + shift(imm), setting the condition flags. |
| SUB | wi | 32 | 100 | - | any | any | Gm | 32-bit subtraction Wd = Wn - shift(imm). |
| SUB | xi | 64 | 101 | - | any | any | Gm | 64-bit subtraction Xd = Xn - shift(imm). |
| CMP | wi | 32C | 110 | - | 11111 | any | Gm | 32-bit subtraction Wn - shift(imm), discarding the result, but setting the condition flags. |
| SUBS | wi | 32S | 110 | - | regno | any | Gm | 32-bit subtraction Wd = Wn - shift(imm), setting the condition flags. |
| CMP | xi | 64C | 111 | - | 11111 | any | Gm | 64-bit subtraction Xn - shift(imm), discarding the result, but setting the condition flags. |
| SUBS | xi | 64S | 111 | - | regno | any | Gm | 64-bit subtraction Xd = Xn - shift(imm), setting the condition flags. |

Encoding:

| 31 | 30 29 | 28 27 26 25 24 | 23 22 | 21 20 19 18 17 16 15 14 13 12 11 10 | 9 8 7 6 5 | 4 3 2 1 0 |
|---|---|---|---|---|---|---|
| sf | op S | 1 0 0 0 1 | shift | imm12 | Rn | Rd |

← 810

Assembler syntax (32S): `<mnemonic> <Wd>, <Wn|WSP>, #<imm> {, <shift>}`
Assembler syntax (32C): `<mnemonic> <Wn|WSP>, #<imm> {, <shift>}`
Assembler syntax (32): `<mnemonic> <Wd|WSP>, <Wn|WSP>, #<imm> {, <shift>}`
Assembler syntax (64S): `<mnemonic> <Xd>, <Xn|SP>, #<imm> {, <shift>}`
Assembler syntax (64C): `<mnemonic> <Xn|SP>, #<imm> {, <shift>}`
Assembler syntax (64): `<mnemonic> <Xd|SP>, <Xn|SP>, #<imm> {, <shift>}` where:
- `<mnemonic>` is one of the mnemonics listed above for the syntax form, and is encoded in the "op" and "sf" fields.
- `<Wd>` is the destination 32-bit general register, encoded in the "Rd" field.
- `<Wd|WSP>` is the destination 32-bit register or SP, encoded in the "Rd" field.
- `<Xd>` is the destination 64-bit general register, encoded in the "Rd" field.
- `<Xd|SP>` is the destination 64-bit register or SP, encoded in the "Rd" field.
- `<Wn|WSP>` is the source 32-bit register or SP, encoded in the "Rn" field.
- `<Xn|SP>` is the source 64-bit register or SP, encoded in the "Rn" field.
- `<imm>` is a 12-bit unsigned immediate encoded in the "imm12" field.
- `<shift>` is a shift to be applied to the immediate, encoded in the "shift" field. Valid values are LSL #0(encoding '00') and LSL #12 (encoding '01'). If absent, defaults to LSL #0.

FIG. 8A

ADD-SUBTRACT INSTRUCTION

Pseudocode-decode part:
```
enumeration AddSubOp {AddSubOp_ADD, AddSubOp_SUB};
AddSubOp opcode = if op == '0' then AddSubOp_ADD else AddSubOp_SUB,
boolean is64bit = (sf == '1');
boolean setflags = (S == '1');
integer d = UInt(Rd);
integer n = UInt(Rn);
bits(64) imm64 = ZeroExtend(imm12, 64);
integer shift_amount;
case shift of
    when '00' shift_amount = 0;
    when '01' shift_amount = 12;
    when '10' UNDEFINED;
    when '11' UNDEFINED,
if !is64bit && (n == 31 || (!setflags && d == 31)) then UNPREDICTABLE;  // No 32-bit SP
```

Pseudocode-execute part:
```
bits (64) operand1 = if n == 31 then SP[] else X[n];
bits (64) operand2 = LSL(imm64, shift_amount);
bits (64) result;
bits (4) nzcv;
case opcode of
    when AddSubOp_ADD carry_in = '0';  // operand2 unchanged
    when AddSubOp_SUB carry_in = '1'; operand2 = NOT(operand2);
if is64bit then
    (result, nzcv) = AddWithCarry(operand1, operand2, carry_in);
else
    (result<31:0>, nzcv) = AddWithCarry(operand1<31:0>, operand2<31:0>, carry_in);
    result<63:32> = bits(32) UNKNOWN;
if setflags then CFLAGS = nzcv;  // else nzcv discarded
if d == 31 then
    if !setflags then SP[] = result;  // else result discarded
else
    X[d] = result;
```

Pseudocode = support function:
```
// AddWithCarry()
// =============
// Note difference from the ARM ARM function: this returns a complete NZCV set of flags.

(bits(N), bits (4)) AddWithCarry(bits(N) x, bits(N) y, bit carry_in)
    integer unsigned_sum = UInt(x) + UInt(y) + UInt (carry_in);
    integer signed_sum = SInt(x) + SInt(y) + UInt(carry_in);
    bits(N) result       = unsigned_sum<N-1:0>;   // == signed_sum<N-1:0>
    bits(4) nzcv;
    nzcv<3>    = result<N-1>;
    nzcv<2>    = IsZeroBit(result);
    nzcv<1>    = if UInt (result) == unsigned_sum then '0' else '1';
    nzcv<0>    = if SInt(result) == signed_sum then '0' else '1';
    return (result, nzcv);
```

Pseudocode notes: CFLAGS is a working name for the NZCV condition flags. Their final representation in pseudocode is not yet decided,

FIG. 8B

Instruction class name: Load-store register
Qualifier: (unsigned immediate)
Instruction class ID: ldst_pos
Mnemonics (completed):

Supplementary Instruction - Option2

| Mnemonic | Qualifier | Syntax form variant | Opcode Vopc size | Registers Rt | Rn | Status | Description |
|---|---|---|---|---|---|---|---|
| STRB | w | 32 0 | 00000 | any | any | Gm | Store byte from Wt to memory addressed by Xn\|SP plus a 12-bit unsigned immediate. |
| STRH | w | 32 1 | 00001 | any | any | Gm | Store halfword from Wt to memory addressed by Xn\|SP plus two times a 12-bit unsigned immediate. |
| STR | w | 32 2 | 00010 | any | any | Gm | Store word from Wt to memory addressed by Xn\|SP plus four times a 12-bit unsigned immediate. |
| STR | x | 64 3 | 00011 | any | any | Gm | Store doubleword from Xt to memory addressed by Xn\|SP plus eight times a 12-bit unsigned immediate. |
| LDRB | w | 32 0 | 00100 | any | any | Gm | Load byte from memory addressed by Xn\|SP plus a 12-bit unsigned immediate, then zero-extend it into Wt. |
| LDRH | w | 32 1 | 00101 | any | any | Gm | Load halfword from memory addressed by Xn\|SP plus two times a 12-bit unsigned immediate, then zero-extend it into Wt. |
| LDR | w | 32 2 | 00110 | any | any | Gm | Load word from memory addressed by Xn\|SP plus four times a 12-bit unsigned immediate to Wt. |
| LDR | x | 64 3 | 00111 | any | any | Gm | Load doubleword from memory addressed by Xn\|SP plus eight times a 12-bit unsigned immediate to Xt. |
| LDRSB | x | 64 0 | 01000 | any | any | Gm | Load byte from memory addressed by Xn\|SP plus a 12-bit unsigned immediate, then sign-extend it into Xt. |
| LDRSH | x | 64 1 | 01001 | any | any | Gm | Load halfword from memory addressed by Xn\|SP plus two times a 12-bit unsigned immediate, then sign-extend it into Xt. |
| LDRSW | x | 64 2 | 01010 | any | any | Gm | Load word from memory addressed by Xn\|SP plus four times a 12-bit unsigned immediate, then sign-extend it into Xt. |
| PRFM | (none) | P 3 | 01011 | prfop | any | Gm | Prefetch memory addressed by Xn\|SP, plus eight times a 12-bit unsigned immediate. |
| LDRSB | w | 32 0 | 01100 | any | any | Gm | Load byte from memory addressed by Xn\|SP plus a 12-bit unsigned immediate, then sign-extend it into Wt. |
| LDRSH | w | 32 1 | 01101 | any | any | Gm | Load halfword from memory addressed by Xn\|SP plus two times a 12-bit unsigned immediate, then sign-extend it into Wt. |
| . | . | . . | 0111x x | any | any | Gm | UNDEFINED |
| STR | b | B 0 | 10000 | any | any | Gm | Store byte from FP/SIMD register Bt to memory addressed by Xn\|SP plus a 12-bit unsigned immediate. |
| STR | h | H 1 | 10001 | any | any | Gm | Store halfword from FP/SIMD register Ht to memory addressed by Xn\|SP plus two times a 12-bit unsigned immediate. |
| STR | s | S 2 | 10010 | any | any | Gm | Store word from FP/SIMD register St to memory addressed by Xn\|SP plus four times a 12-bit unsigned immediate. |
| STR | d | D 3 | 10011 | any | any | Gm | Store doubleword from FP/SIMD register Dt to memory addressed by Xn\|SP plus eight times a 12-bit unsigned immediate. |
| LDR | b | B 0 | 10100 | any | any | Gm | Load byte from memory addressed by Xn\|SP plus a 12-bit unsigned immediate to FP/SIMD register Bt. |
| LDR | h | H 1 | 10101 | any | any | Gm | Load halfword from memory addressed by Xn\|SP plus two times a 12-bit unsigned immediate to FP/SIMD register Ht. |
| LDR | s | S 2 | 10110 | any | any | Gm | Load word from memory addressed by Xn\|SP plus four times a 12-bit unsigned immediate to FP/SIMD register St. |
| LDR | d | D 3 | 10111 | any | any | Gm | Load doubleword from memory addressed by Xn\|SP plus eight times a 12-bit unsigned immediate to FP/SIMD register Dt. |
| . | . | . . | 11xx0 | any | any | Gm | UNDEFINED |
| . | . | . . | 11x0x | any | any | Gm | UNDEFINED |
| STR | q | Q 3 | 11011 | any | any | Gm | Store pair of doublewords from FP/SIMD register Qt to memory addressed by Xn\|SP plus eight times a 12-bit unsigned immediate. |
| LDR | q | Q 3 | 11111 | any | any | Gm | Load pair of doublewords from memory addressed by Xn\|SP plus eight times a 12-bit unsigned immediate to FP/SIMD register Qt. |

FIG. 9A

Supplementary Instruction - Option2

Future enhancement note:   Opcodes 11x0x is the obvious extension space for further sizes of scalar.

Mnemonic aliases:

| Alias: Mnemonic | Qualifier | Syntax form | variant | If condition below holds | Is equivalent to: Mnemonic | | | Preferred? |
|---|---|---|---|---|---|---|---|---|
| STRB | x | 64 | 0 | Unconditionally | STRB | \<Wt\>, | [\<Xn\|SP\>{, #\<pimm\>}] | Main table |
| STRH | x | 64 | 1 | Unconditionally | STRH | \<Wt\>, | [\<Xn\|SP\>{, #\<pimm\>}] | Main table |
| STRW | x | 64 | 2 | Unconditionally | STR | \<Wt\>, | [\<Xn\|SP\>{, #\<pimm\>}] | Main table |
| STRW | w | 32 | 2 | Unconditionally | STR | \<Wt\>, | [\<Xn\|SP\>{, #\<pimm\>}] | Main table |
| LDRB | x | 64 | 0 | Unconditionally | LDRB | \<Wt\>, | [\<Xn\|SP\>{, #\<pimm\>}] | Main table |
| LDRH | x | 64 | 1 | Unconditionally | LDRH | \<Wt\>, | [\<Xn\|SP\>{, #\<pimm\>}] | Main table |
| LDRW | x | 64 | 2 | Unconditionally | LDR | \<Wt\>, | [\<Xn\|SP\>{, #\<pimm\>}] | Main table |
| LDRW | w | 32 | 2 | Unconditionally | LDR | \<Wt\>, | [\<Xn\|SP\>{, #\<pimm\>}] | Main table |
| LDRSW | w | 32 | 2 | Unconditionally | LDR | \<Wt\>, | [\<Xn\|SP\>{, #\<pimm\>}] | Main table |

Encoding:

| 31 30 29 28 27 26 25 24 23 22 21 20 19 18 17 16 15 14 13 12 11 10 9 8 7 6 5 4 3 2 1 0 |
|---|
| size | 1 1 1 | V | 0 1 1 | opc | imm12 | Rn | Rt |

⟵ 910

Assembler syntax (32):  \<mnemonic::\>   \<Wt\>, [\<Xn|SP\>{, #\<pimm\>}]
Assembler syntax (64):  \<mnemonic::\>   \<Xt\>, [\<Xn|SP\>{, #\<pimm\>}]
Assembler syntax (B):   \<mnemonic::\>   \<Bt\>, [\<Xn|SP\>{, #\<pimm\>}]
Assembler syntax (H):   \<mnemonic::\>   \<Ht\>, [\<Xn|SP\>{, #\<pimm\>}]
Assembler syntax (S):   \<mnemonic::\>   \<St\>, [\<Xn|SP\>{, #\<pimm\>}]

FIG. 9A (continued)

LOAD-STORE REGISTER INSTRUCTION

Assembler syntax (D):   <mnemonic>   <Dt>,    [<Xn|SP>{, #<pimm>}]
Assembler syntax (Q):   <mnemonic>   <Qt>,    [<Xn|SP>{, #<pimm>}]
Assembler syntax (P):   <mnemonic>   <prfop>, [<Xn|SP>{, #<pimm>}]
where:

<mnemonic>   Is one of the mnemonics listed above for the syntax form, and is encoded in the "V", "size" and "opc" fields.
<Wt>         Is the 32-bit general register to be transferred, encoded in the "Rt" field.
<Xt>         Is the 64-bit general register to be transferred, encoded in the "Rt" field.
<Bt>         Is the 8-bit FP/SIMD register to be transferred, encoded in the "Rt" field.
<Ht>         Is the 16-bit FP/SIMD register to be transferred, encoded in the "Rt" field.
<St>         Is the 32-bit FP/SIMD register to be transferred, encoded in the "Rt" field.
<Dt>         Is the 64-bit FP/SIMD register to be transferred, encoded in the "Rt" field.
<Qt>         Is the 128-bit FP/SIMD register to be transferred, encoded in the "Rt" field.
<Xn|SP>      Is the 64-bit base register of SP, encoded in the "Rn" field.
<pimm>   0   Is the positive immediate offset, which defaults to 0 and is in the range 0 to 4095, with the "imm12" field encoding <pimm>.
<pimm>   1   Is the positive immediate offset, which defaults to 0 and is an even number in the range 0 to 8190, with the "imm12" field encoding <pimm>/2.
<pimm>   2   Is the positive immediate offset, which defaults to 0 and is a multiple of 4 in the range 0 to 16380, with the "imm12" field encoding <pimm>/4.
<pimm>   3   Is the positive immediate offset, which defaults to 0 and is a multiple of 8 in the range 0 to 32760, with the "imm12" field encoding <pimm>/8.
<prfop>      Is the prefetch operation type, encoded as a 5-bit immediate in the "Rt" field.
             *prfop<4:3>  00=preload data, 10=prepare for store, x1=no-op
             *prfop<2:1>  00=target L1 cache, 01=target L2 cache, 10=target L3 cache, 11=no-op
             *prfop<0>    0=non-streaming (temporal) preload, 1=streaming (non-temporal) preload

FIG. 9B

LOAD-STORE REGISTER INSTRUCTION

Pseudocode - decode part:

```
enumeration LdStOp {LdStOp_Store, LdStOp_Load, LdStOp_ULoad, LdStOp_SLoad},
LdStOp opcode;
integer memsize;
integer regsize;
case size:opc of
    when '0000'    opcode = LdStOp_Store;   memsize = 1;   regsize = 32;
    when '0001'    opcode = LdStOp_ULoad;   memsize = 1;   regsize = 32;
    when '0010'    opcode = LdStOp_Store;   memsize = 2;   regsize = 32;
    when '0011'    opcode = LdStOp_ULoad;   memsize = 2;   regsize = 32;
    when '0100'    opcode = LdStOp_Store;   memsize = 4;   regsize = 32;
    when '0101'    opcode = LdStOp_Load;    memsize = 4;   regsize = 32;
    when '0110'    opcode = LdStOp_Store;   memsize = 8;   regsize = 64;
    when '0111'    opcode = LdStOp_ULoad;   memsize = 2;   regsize = 64;
    when '1000'    opcode = LdStOp_SLoad;   memsize = 1;   regsize = 32;
    when '1001'    opcode = LdStOp_SLoad;   memsize = 1;   regsize = 64;
    when '1010'    opcode = LdStOp_ULoad;   memsize = 1;   regsize = 64;
    when '1011'    opcode = LdStOp_SLoad;   memsize = 2;   regsize = 32;
    when '1100'    opcode = LdStOp_ULoad;   memsize = 4;   regsize = 64;
    when '1101'    opcode = LdStOp_SLoad;   memsize = 4;   regsize = 64;
    when '1110'    opcode = LdStOp_Load;    memsize = 8;   regsize = 64;
    when '1111'    opcode = LdStOp_SLoad;   memsize = 2;   regsize = 64;

integer t = UInt(Rt);      if t = = 31 then *TBD*;
integer n = UInt(Rn);      // n = = 31 encodes SP
integer imm = UInt (imm12) * memsize;
```

FIG. 9B (continued)

ADDRESS GENERATION IN A DATA PROCESSING APPARATUS

This application is a continuation of U.S. patent application Ser. No. 13/361,229, filed Jan. 30, 2012, which claims priority to GB Application No. 1103823.9 filed Mar. 7, 2011, the contents of each of which are hereby incorporated by reference in this application.

BACKGROUND

The present invention relates to data processing. In particular, the present invention relates to address generation in a data processing apparatus.

Addressing modes are an aspect of instruction set architecture in most data processor designs. In this application an addressing mode refers to the mechanism by which program instructions in the instruction set calculate the address of an operand in memory using information held in registers and parameters encoded within the program instruction. Different instruction set architectures vary in the number of addressing modes that they support. Examples of known addressing modes are absolute addressing where the address is the address parameter itself and "base plus offset" addressing where the address is given by an offset parameter added to the contents of a specified base register and program counter (PC) relative addressing where the address is given by an offset parameter added to the current value of the program counter. PC-relative addressing has the advantage that it enables program code to be made position-independent such that it can be loaded at any virtual address within the available address space supported by the processor without the requirement to modify any address parameters stored within the program code. Position-independent code is increasingly important in modern software systems for dynamically loaded shared libraries, and as a security measure for application programs.

However as the memory capacity of data processors and the memory requirement of program applications increase the number of bits required to specify a memory address has tended to increase over time. Thus there is a problem in instruction set architectures having a limited instruction size of how to specify a memory address or offset parameter with a large number of bits relative to the maximum program instruction size. In relative addressing the number of bits associated with the offset parameter that provides the offset from the base address limits the maximum amount of memory that is directly addressable using that addressing mode. Thus for example in RISC processors such as ARM processors, a requirement to specify, for example, a 33-bit signed offset where the program instructions have a maximum size of 32 bits presents a problem. Typically a plurality of separate program instructions would be required to construct an offset that is large relative to the size of the program instructions of the instruction set architecture. In the following description it shall be considered that instructions have a length whereas data has a width. Furthermore, one previously known method of implementing larger offsets for a given instruction size would typically involve storing the larger offset in a memory location, then loading it from that memory location using a relative addressing mode with a smaller offset range, before using that larger offset in a second, different program instruction to compute the target memory address. This leads to a dependency between the two different instructions and may cause inefficiencies in processing, particularly if the initial load operation involved a miss in the data cache, resulting in pipeline stalls and thus processing delay. Accordingly, there is a requirement to provide a position-independent addressing mechanism having an extended offset range, the offset being large relative to the instruction size, in a manner that can be efficiently implemented inline using parameters within the program instructions without additional data memory accesses and storage requirements.

In this application a frame refers to a unit of virtual address space where the frame size is $2^F$ bytes and F is the predetermined number of intra-frame offset bits. The frame base address is an address at a predetermined offset within the frame. The virtual address space of the processor is thus divided into a consecutive sequence of non-overlapping frames of equal size, each having a unique frame base address.

SUMMARY

The present invention provides a data processing apparatus comprising:

processing circuitry for processing data;

an instruction decoder responsive to program instructions to generate control signals for controlling said processing circuitry to perform said data processing;

wherein said program instructions comprise an address calculating instruction having an instruction size, said instruction decoder being responsive to said address calculating instruction to perform an address calculating operation for calculating a partial address result from a non-fixed reference address and a partial offset value such that a full address specifying a memory location of an information entity is calculable from said partial address result using at least one supplementary program instruction and wherein said partial offset value has a bit-width greater than or equal to said instruction size and is encoded within at least one partial offset field of said address calculating instruction.

The present invention recognises that a memory address can be calculated efficiently in a process that involves a first stage of executing an address calculating instruction to generate a partial address result from a non-fixed reference address (for example, a program counter) and a partial offset value (for example, a memory address relative to the non-fixed reference address) so that a full address, specifying an absolute memory location of an information entity, is calculable from the partial address result using at least one supplementary program instruction. The partial offset value has a bit-width greater than or equal to the instruction size and is encoded within at least one partial offset field of the address calculating instruction.

The encoding of the partial offset value within the address calculating instruction itself according to the present technique avoids having to store a large offset to memory by computing the offset at program creation time so that it forms part of a program image that is loaded by the operating system. The reference address used to calculate the partial offset value is a non-fixed or variable reference address (in contrast to, for example, a fixed reference address of zero) so that the partial offset value that is decoded from the address calculating instruction provides a relative offset rather than an absolute (partial) memory address.

The use of the address calculating instruction to specify the partial offset value by encoding it inline within the instruction itself and the use of the at least one supplementary program instruction together with the address calculating instruction to obtain the absolute memory location of an information entity provides greater flexibility and improved efficiency in specifying absolute memory addresses. In particular it enables offsets that are large relative to the instruction size to be readily specified inline in the specified combination of at least two instructions (address calculating instruction and at least one supplementary program instruction) avoiding storage to and retrieval from memory of the comparatively large offset.

The frame offset value used to compute the partial address result is derived from at least one frame offset field of the address calculating instruction itself so the partial address result already comprises a portion of the location information of the information entity within memory. The remaining portion of the location information for the information entity within memory can then be readily specified via the at least one further program instruction without any requirement to either: (i) store the offset value or a portion thereof within the main memory; or (ii) to incorporate the full offset itself within the address calculating instruction having a fixed instruction size. Thus, according to the present technique, a more efficient way of specifying a relative address having an extended offset range is provided because it allows the memory address to be constructed inline from parameters within the program instructions rather than via references to main memory. It also enables an optimising compiler to split the relative address computation into a high part and a low part so as to process and reuse these two parts more independently.

In some embodiments, the program instructions comprise the at least one supplementary program instruction such that the full address is obtained by execution of a set comprising at least two program instructions comprising the address calculating instruction and the at least one supplementary program instruction.

In some embodiments the full address is specified by a full offset value and the non-fixed reference address and wherein the at least one supplementary instruction provides a supplementary offset value such that the partial offset value and the supplementary offset value together specify the full offset value.

In some embodiments, wherein the supplementary offset value is encoded within at least one supplementary offset field of the at least one further instruction.

In some embodiments, the partial offset value forms a first portion of the full offset value and wherein the supplementary offset value forms a further portion of the full offset value.

In some embodiments, a bit-width of the full offset value is greater than or equal to the instruction size.

In some embodiments, the full offset value is a 33-bit signed offset and the instruction size is 32 bits.

In some embodiments, the data processing apparatus has access to a virtual address space having a plurality of memory frames of predetermined frame size and wherein the partial offset value is a frame offset value specifying relative to the non-fixed reference address a frame base address for a frame containing the information entity.

In some embodiments, partial offset value is obtained from the encoding in the at least one partial offset field and has a bit-width greater than a combined bit-width of the at least one partial offset field.

In some embodiments, the partial offset value comprises the encoding in the at least one partial offset field and a predetermined bit-width of zeros.

In some embodiments, predetermined frame size corresponds to a number of bytes that is $2^F$ where F is the number of intra-frame offset bits and wherein the frame base address is at a predetermined offset within the frame.

In some embodiments, the address calculating operation comprises:
(i) deriving the frame offset value from at least one field of the address calculating instruction encoding the partial offset value;
(ii) generating the partial address result comprising the frame base address.

In some embodiments, the at least one supplementary program instruction comprises at least one intra-frame offset field specifying an intra-frame offset value, the intra-frame offset value specifying relative to the frame base address, a location of the information entity within the frame of memory and wherein upon execution of the at least one supplementary instruction, the intra-frame offset value is combined with the frame base address result to generate the full address.

It will be appreciated that the supplementary instruction could be any instruction that has the effect of combining the intra-frame offset value with the partial address result to generate a full address. However, in some embodiments the supplementary instruction comprises one of an add instruction and a memory access instruction, for example, a load or a store instruction which uses the "base plus offset" addressing mode. These instructions are commonly provided for other data processing and memory access purposes and deployment of these instructions for full address generation in this way provides for efficient reuse of pre-existing instructions without requiring a special-purpose supplementary instruction specific to position-independent addressing.

It will be appreciated that calculation of the full address could comprise execution first of the address calculating instruction and immediately followed by execution of the at least one further program instruction that is used to compute the full address. However, in some embodiments the data processing apparatus is configured to execute a sequence of program instructions comprising the address calculating instruction and the supplementary instruction and the supplementary instruction is executed subsequently to execution of the address calculating instruction, but following execution of one or more intervening program instructions. This provides the flexibility to separate the address calculating instruction and the supplementary instruction within the sequence of program instructions, and thus gives more programming freedom yet does not compromise the accuracy of the calculation of the full address.

It will be appreciated that the data processing apparatus could be configured to execute a sequence of program instructions comprising a single instance of the address calculating instruction and a single instance of the associated supplementary instruction. However, in some embodiments the data processing apparatus is configured to execute a sequence of program instructions comprising a plurality of instances of the address calculating instruction, each of the plurality of instances specifying the partial address of a predetermined information entity, i.e. a plurality of instances specifying the same partial address. Thus a plurality of different address calculating instructions can be used having different values of, for example, a program counter upon execution, yet the plurality of instances of the address calculating instruction can all be used to specify the same full target address upon execution of the at least one further program instruction. This provides additional flexibility in memory address calculation allowing it to be accurately calculated from several different points in a program sequence with ease.

Alternatively, a single instance of the address calculating instruction can be used to generate a partial address that can then be used by a plurality of the at least one further supplementary program instructions.

It will be appreciated that the address-calculating instruction bit-width and the full address bit-width could be the same. However, in some embodiments the address calculating instruction has an instruction bit-width and the full address has a full address bit-width different form said instruction bit-width.

It will be appreciated that the total width of the at least one frame offset field within the address calculating instruction and the frame offset value could have identical bit-width. However, in some embodiments, the at least one frame offset field has a total first bit-width and the frame offset value has a second bit-width larger than the first bit-width.

It will be appreciated that the frame offset value encoded within the address calculating instruction and the full address could have identical bit-width. However, in some embodiments, the frame offset value has a second bit-width and the full address has a third bit-width different from the second bit-width.

It will be appreciated that the partial address result could have any desired bit-width, but in some embodiments the partial address result is calculated such that it has a bit-width equal to the third bit-width that is associated with the full address. This simplifies the supplementary calculation that has to be performed to arrive at the full address since the partial address result is already of the desired bit-width corresponding to the full address.

The first bit-width corresponding to the total width of the at least one frame offset fields within the address calculating instruction and the third bit-width corresponding to the full address (and possibly also to the partial address result) could be selected from a wide range of different possible bit-width. However, in some embodiments the total first bit-width is 21 bits and the third bit-width is 64 bits. This is convenient because several known RISC instruction set architectures instructions have a maximum bit-width of 32 bits and an address bit-width of 64 bits is sufficient to specify any address within a virtual address space of size up to $2^{64}$ bytes.

It will be appreciated that calculation of the partial address result could comprise any one of a wide variety of different processing functions. However, in some embodiments calculation of the partial address result comprises expanding the first bit-width to the second bit-width corresponding to the frame offset value by multiplying the at least one frame offset field by the frame size, and then expanding the second bit-width to the third bit-width corresponding to the full address by performing a sign extension. Expansion of the frame offset value in this way is important because the offset value will be negative if the partial address result is lower than the reference address. Accordingly, the frame offset value is sign extended before adding it to the reference address.

It will be appreciated that the full address could be produced using the intra-frame offset value specified by the at least one further instruction together with the frame offset value specified via at least one field within the address calculating instruction itself by combining these pieces of information in any one of a number of different ways. However, in one embodiment the frame offset value is added to the intra-frame offset value to generate a combined offset value corresponding to the full address and the combined offset value specifies a location of the information entity relative to the non-fixed reference address. Addition of the frame offset value with the intra-frame offset value in this way is a straightforward way of generating the full address that can be easily implemented.

It will be appreciated that the combined offset value could have any one of a range of different bit-widths such as a bit-width less than the bit-width of the address calculating instruction. However, in some embodiments, the combined offset value has a bit-width greater than the bit-width of the address calculating instruction. This requires the use of offset values that are large relative to the bit-width of the address calculating instruction itself. Such comparatively large bit-widths might otherwise require storage of the large offset in main memory thereby increasing the program size and incurring processing inefficiencies that will typically result from loading the offset values from main memory.

It will be appreciated that a portion of the partial address result corresponding in position to the intra-frame offset bits of the full address could contain any predetermined value because the corresponding field of the full address is intended to, upon execution of the at least one further program instruction, to hold a computed value. Thus, for example, if the at least one further program instruction is an add instruction, the intra-frame offset value is added to the partial address result to generate the full address. However, in some embodiments a portion of the partial address result other than frame base address but corresponding the intra-frame offset bits of the full address is a multi-bit value having a numerical value of zero. If this portion of the partial address is set equal to zero then upon execution of the at least one further program instruction, the intra-frame offset value is effectively copied from the at least one further program instruction into the intra-frame offset bits of the full address. This zero value is straightforward to implement and ensures that regardless of the point in a sequence of program instructions at which the address calculating instruction is executed, a consistent value is stored in the portion of the partial address result corresponding in position to the intra-frame offset bits of said full address. This helps to ensure that different instances of the address calculating instruction within a sequence of program instruction can all be used to reliably calculate the same partial address of a predetermined variable.

It will be appreciated that the reference address relative to which the frame offset value is specified could correspond to any chosen reference address. However, in some embodiments the reference address depends upon the program counter. This means that the reference address is implicit, and it is not necessary to explicitly specify a register which holds the reference address within the address calculating instruction itself. Thus the instruction can contain a larger frame offset field. Furthermore, since many data processing apparatuses execute sequences of program instructions according to the address within the program counter, this provides a convenient base against which to reference the frame offset value to permit position-independent addressing.

It will be appreciated that the reference address could depend upon the program counter in a variety of different ways, but in some embodiments the non-fixed reference address specifies the frame base address of the frame of memory addressed by the program counter.

In some embodiments where the non-fixed reference address depends upon a program counter, the non-fixed reference address is obtained by setting a predetermined number of least significant bits in said program counter to zero, said predetermined number depending upon said predetermined frame size. This ensures that the bits of the program counter that are used in calculation of the partial address specify only the lowest address of the frame of memory addressed by the program counter rather than also providing an offset within the frame that depends upon the address in the program counter. This ensures that different address calculating instructions where the total bit-width of the frame offset fields is less than the bit-width of frame offset value and which occur at different points in a sequence of program code can be consistently used for calculating the same partial address despite the fact that the program counter that points to those different address calculating instructions has a different value in each case.

It will be appreciated that the predetermined number of frame offset bits and hence the size of the frame of memory could be set to any one of a number of different values. However, in some embodiments the size of a frame of memory is set to less than or equal to a minimum granularity at which a set of program code comprising the address calculating instruction and associated information entity can be relocated by an operating system running on the data processing apparatus. If the address calculating instructions and the information entity which they are referencing are relocated by the same amount, and that amount is a multiple of the frame size, then both the frame offset value and the intra-frame offset value may be used unchanged, and thus the program code does not need to be modified as part of the relocation process.

It will be appreciated that the size of the frame of memory according to the present technique could be set to be equal to a memory page size used for the purposes of memory management e.g. the memory page size used by a memory management unit of the data processing apparatus. However, in some embodiments the memory page size may be set to an integer multiple of the frame size.

According to the second aspect the present invention provides a data processing method for performing data processing on a data processing apparatus, said method comprising:

in response to program instructions, generating control signals for controlling processing circuitry to perform said data processing;

in response to an address calculating instruction having an instruction size, performing an address calculating operation for calculating a partial address result from a non-fixed reference address and a partial offset value such that a full address specifying a memory location of an information entity is calculable from said partial address result using at least one supplementary program instruction and wherein said partial offset value has a bit-width greater than or equal to said instruction size and is encoded within at least one partial offset field of said address calculating instruction.

According to a third aspect, the present invention provides a data processing apparatus comprising:

processing circuitry for processing data;

an instruction decoder responsive to program instructions to generate control signals for controlling said processing circuitry to perform said data processing;

wherein said program instructions comprise a supplementary program instruction having an instruction size, said instruction decoder being responsive to said supplementary program instruction to perform an address calculating operation for calculating a full address result specifying a memory location of an information entity, said supplementary program instruction having an input operand corresponding to a partial address result calculated from a partial offset value and a non-fixed reference address, wherein said supplementary program instruction comprises at least one supplementary offset field encoding a supplementary offset value and wherein said partial offset value and said supplementary offset value together specify a full offset value.

The supplementary program instruction may not be specific to the purpose of generation of a full offset from a partial offset and a supplementary offset, but may be, for example, an existing data processing and/or memory access instruction such as a general purpose add instruction. However, the existing data processing instruction is specially configured according to the present technique to generate a full offset given a partial address result generated from a partial offset and a non-zero reference value.

According to a fourth aspect, the present invention provides a data processing method for performing data processing on a data processing apparatus, said method comprising:

in response to program instructions, generating control signals for controlling processing circuitry to perform said data processing;

in response to a supplementary program instruction having an instruction size, performing an address calculating operation for calculating a full address result specifying a memory location of an information entity, said supplementary program instruction having an input operand corresponding to a partial address result calculated from a partial offset value and a non-fixed reference address, wherein said supplementary program instruction comprises at least one supplementary offset field encoding a supplementary offset value and wherein said partial offset value and said supplementary offset value together specify a full offset value.

According to a fifth aspect, the present invention provides a data processing apparatus comprising:

processing circuitry for processing data;

an instruction decoder responsive to program instructions to generate control signals for controlling said processing circuitry to perform said data processing;

wherein said program instructions comprise an instruction pair comprising an address calculating instruction having an instruction size and at least one supplementary program instruction, said instruction decoder being responsive to said instruction pair to perform an address calculating operation for calculating a full address result specifying a memory location of an information entity relative to a non-fixed reference address, wherein said address calculating instruction encodes a partial offset value within at least one partial offset field of said address calculating instruction and said at least one supplementary instruction comprises at least one supplementary offset field encoding a supplementary offset value such that said partial offset value and said supplementary offset value together specify said full address result when added to said non-fixed reference address and wherein a combined bit-width of said partial offset value and said supplementary offset value is greater than or equal to said instruction size.

According to a sixth aspect, the present invention provides a data processing method for performing data processing on a data processing apparatus, said method comprising:

in response to program instructions, generating control signals for controlling processing circuitry to perform said data processing;

in response to an instruction pair comprising an address calculating instruction having an instruction size and at least one supplementary program instruction, performing an address calculating operation for calculating a full address result specifying a memory location of an information entity relative to a non-fixed reference address, wherein said address calculating instruction encodes a partial offset value within at least one partial offset field of said address calculating instruction and said at least one supplementary instruction comprises at least one supplementary offset field encoding a supplementary offset value such that said partial offset value and said supplementary offset value together specify said full address result when added to said non-fixed reference address and wherein a combined bit-width of said partial offset value and said supplementary offset value is greater than or equal to said instruction size.

Other aspects and features of the present invention are set out in the appended claims.

The above, and other objects, features and advantages of this invention will be apparent from the following detailed description of illustrative embodiments which is to be read in connection with the accompanying drawings.

BRIEF DESCRIPTION OF THE DRAWINGS

FIG. 6 schematically illustrates how the address calculating instruction and the supplementary instruction according to the present technique have the feature of separability and reuse;

FIG. 7 schematically illustrates full details of a program counter-relative addressing instruction;

FIGS. 8A and 8B schematically illustrate details of an add-subtract class of instructions that is a first option for the at least one further instruction corresponding to the present technique;

FIGS. 9A and 9B illustrate details of an alternative further instruction according to the present technique corresponding to a load/store register instruction.

DESCRIPTION OF EXAMPLE EMBODIMENTS

Figure 1:
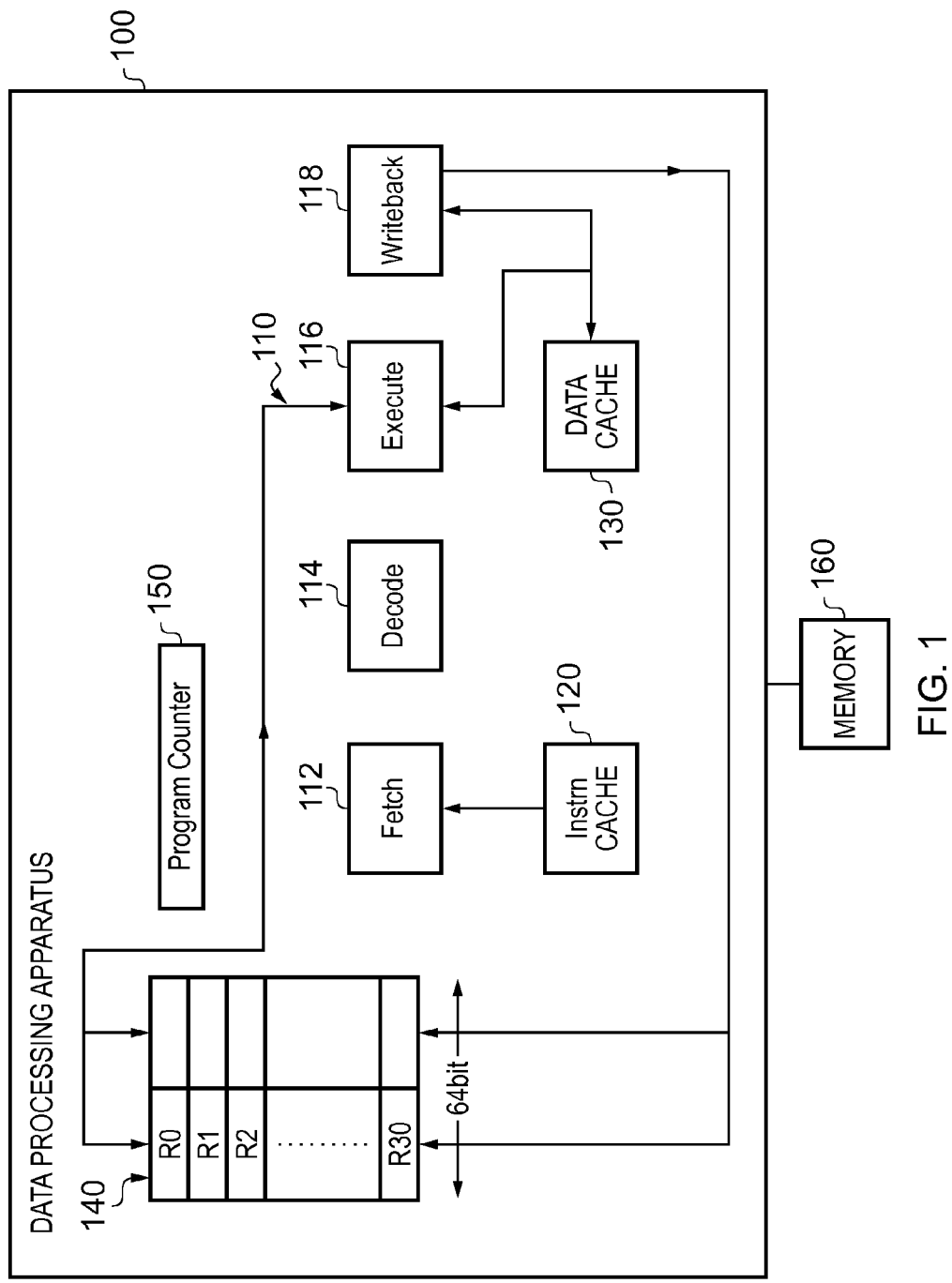
FIG. 1 schematically illustrates a data processing apparatus according to an embodiment of the present invention.

FIG. 1 schematically illustrates a data processing apparatus according to an embodiment of the present invention. The data processing apparatus comprises an integrated circuit 100 including a number of processing components forming a "System-On-Chip". In particular, the integrated circuit 100 comprises an execution pipeline 110, an instruction cache 120, a data cache 130, a set of general purpose registers 140, and a program counter 150. The System-On-Chip 100 has access to an off-chip memory 160.

The data processing apparatus 100 of this embodiment has a RISC (Reduced Instruction Set Computing) architecture, which is a load-store architecture, in which instructions that process data operate only on registers and in which the data processing instructions are separate from instructions that access memory. The pipeline 110 comprises fetch circuitry 112, decode circuitry 114, execute circuitry 116, and writeback circuitry 118. The set of general purpose registers 140 is used to store operands and results of instructions executed by the execution pipeline 110. The data processing apparatus 100 is configured to execute a plurality of different instruction types. In particular, it can execute both instructions operating on 32-bit wide data, referred to as 32-bit instruction forms, and instructions operating on 64-bit wide data referred to as 64-bit instruction forms.

The fetch circuitry 112 is fed instructions from an instruction cache 120. The execute circuitry 116 can read from the data cache 130 and read the register file, whilst the write-back circuitry 118 can both write to and read from the data cache 130. Information is read from the registers 140 at the execute stage and results are typically written to the registers 140 at the write-back stage. The data processing apparatus 100 also has access to the off-chip memory 160 and may be required to retrieve instructions and/or data from the off-chip memory 160 in the event that they are not present in the instruction cache 120 or the data cache 130.

The program counter 150 is a special-purpose register that contains a memory address corresponding to a program instruction to be executed. The program counter 150 stores a 64-bit value in the FIG. 1 arrangement.

To support execution of both 32-bit and 64-bit instruction forms, the general purpose registers 140 are variable-width registers configured such that when the data processing circuitry 100 is executing 32-bit instruction forms, then the registers 140 are viewed by the data processing apparatus as a set of 32-bit registers in which the higher 32-bits are ignored on a read and set to some predetermined value on a write. On the other hand, when the data processing apparatus is executing 64-bit instruction forms, the data processing apparatus 100 is configured such that the registers 140 are viewed as 64-bit registers and their full 64-bit width is utilised.

The data processing apparatus 100 has at least one associated instruction set architecture comprising various addressing modes that define how machine language instructions in that architecture identify the address of the memory operand(s) of each memory access instruction. The given addressing mode specifies how to calculate the memory address of an operand by using information held in the general purpose registers 140 and/or program counter 150 and/or constants contained within the machine instruction itself or elsewhere. Different computer architectures typically vary greatly as to the number of addressing modes that they provide in hardware. One example of an addressing mode, as discussed above, is PC-relative addressing where the address for a PC-relative instruction is specified by an offset parameter that is added to the address held in the program counter. The offset is usually a signed value to allow reference to code or data at a lower or higher address than the current instruction.

An example of a simple addressing mode for data is a "base plus offset" addressing mode where the address is defined in terms of an offset added to the contents of a specified base register. The offset is typically a signed or unsigned value, and if the base register is set to the value of zero for base plus offset addressing then this becomes equivalent to absolute addressing. Absolute or direct addressing requires space in an instruction for quite a large offset. This can be problematic and restrictive where the instruction width is limited to, for example, 32-bit wide instructions since the offset value may typically be limited to 16 bits or less. PC-relative addressing can be used for data or program code and in the case of data, the PC-relative addressing mode can be used to load a register from a "constant" stored in program memory a short distance away from the current instruction. PC-relative addressing is a special case of base plus offset addressing where the program counter is selected as the base register.

Architectures such as the RISC pipelined architecture of FIG. 1 typically support a PC-relative addressing mode with a limited offset value. When this addressing mode is used, the compiler typically places constants in a literal pool immediately before or immediately after the subroutine that used them to prevent accidentally executing those constants as instructions. A load instruction which uses the PC-relative addressing mode reads a constant value from the literal pool and stores the value into one of the general purpose registers 140 and then executes the next instruction. Note that this PC-relative data addressing is different from a PC-relative branch which does not modify any data register but instead sets the PC to the address of some other instruction at the given offset from the branch instruction. PC-relative addressing or base plus offset addressing has the advantage that it provides the ability to construct addresses inline in the program instructions rather than having to make perhaps several references to memory such as the data cache 130 or the off-chip memory 160 in order to obtain the required address.

However, PC-relative addressing and base plus offset addressing have limitations in that the range of addresses that can be accessed is determined by the number of bits within the instruction encoding that can used to specify the offset. For example, a 12-bit offset allows only 4096 different addresses to be accessed relative to the base address, which is small compared with the size of large program applications (typically several megabytes). However, the principle of locality of reference applies, whereby over a short time span many of the data items that a program will typically access will tend to be fairly close to each other in memory. Nevertheless, it is desirable to be able to access larger address ranges via an offset which is specified inline in the program instructions rather than indirectly by reference to memory. Addressing data by storing an address or offset or a portion thereof in the literal pool increases the program size and can lead to inefficiencies and pipeline stalls in the event that loading the offset results in a miss in the data cache 130 thereby necessitating a time consuming access to the off-chip memory 160. Furthermore, dependencies between consecutive load instructions involving loading data from a memory location can also cause pipeline bubbles which reduce the efficiency of processing.

According to the present technique, a PC-relative address with a signed 33-bit offset, for example, can be specified using just two different 32-bit wide program instructions. Accordingly, a small number of instructions is used to specify a large PC-relative offset range. A signed 33-bit offset provides the ability to specify addresses within a range of up to 4 gigabytes higher or lower than the current value of the program counter. This addressing mode of specifying an m-bit offset using an n-bit address calculating instruction and a corresponding supplementary instruction, where m is greater than n, is implemented in the data processing apparatus of FIG. 1.

Figure 2:
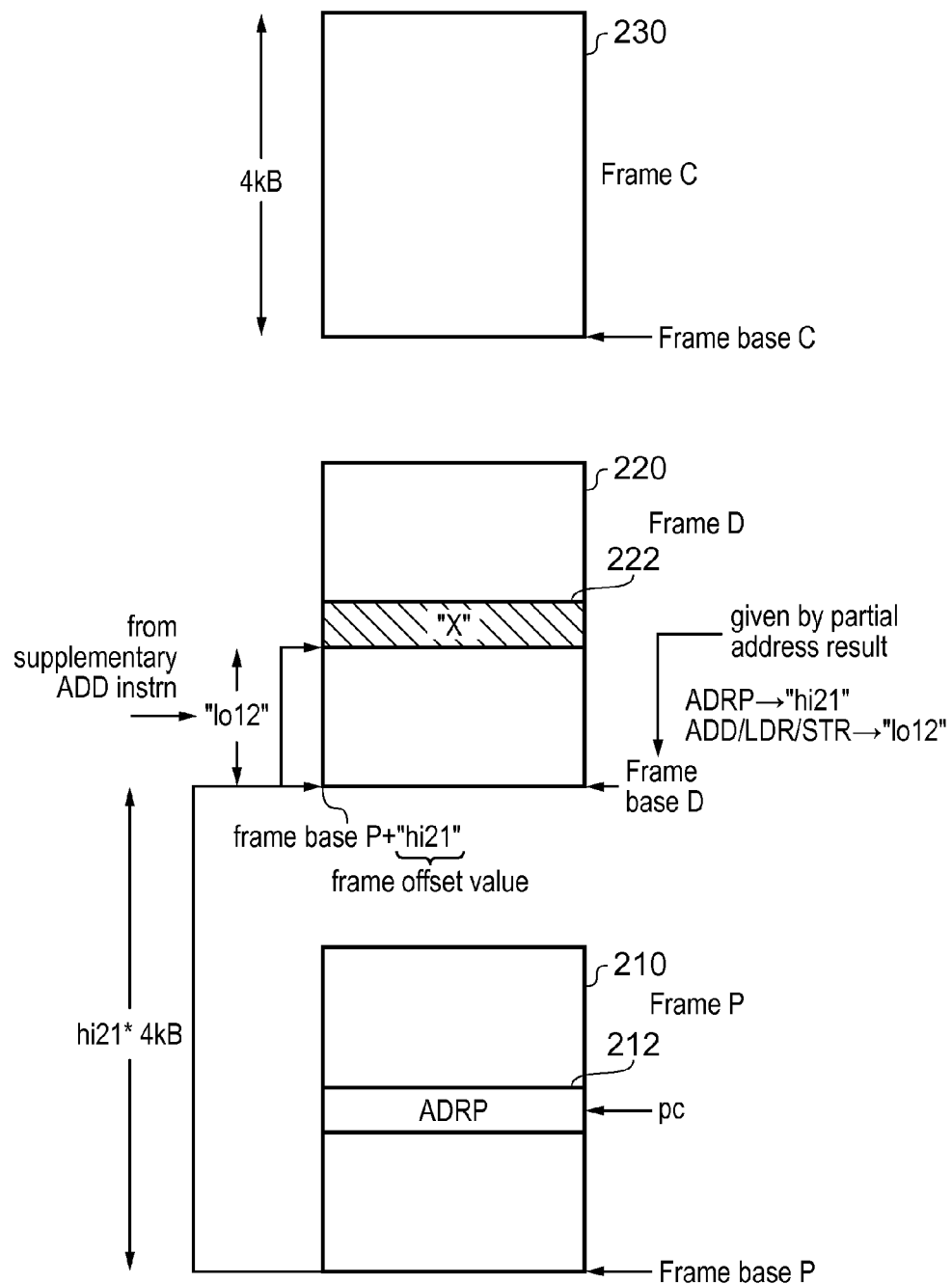
FIG. 2 schematically illustrates how a signed 33-bit PC-relative offset is specified in two parts by executing a combination of two different program instructions.

FIG. 2 schematically illustrates how a full 33-bit offset is specified in two parts by executing a combination of two different program instructions. In particular, an address calculating instruction referred to as an "ADRP" instruction is used to obtain the uppermost 21 bits of a signed 33-bit offset, which is added to the adjusted value of the program counter and the result stored in one of the general purpose registers 140 of FIG. 1, whilst a complementary (i.e. at least one further) instruction that can take one of a plurality of different forms e.g. ADD, LDR, or STR is used to specify the lowermost 12-bits of the 33-bit offset. FIG. 2 shows three distinct frames of virtual memory addresses, each frame in this example comprising a 4 kilobyte unit of memory with a frame base address that is a multiple of 4 kilobytes. Note that the frames of memory illustrated in FIG. 2 are different from the pages of virtual memory used to categorise memory for the purpose of virtual to physical address translation and page table lookup, e.g. the frame size may differ from the page size.

A first memory frame 210 (denoted "Frame P" for program counter) comprises one instance of a memory address calculating instruction ADRP 212 and the program counter 150 currently stored in the program counter register of FIG. 1 is currently pointing to the ADRP instruction 212. A second 4 kilobyte frame of memory 220 (denoted "Frame D" for data) comprises a shaded region 222 containing the value of a variable "X" whose address is to be specified. In other words, the variable X corresponds to the target data address. A third 4 kilobyte frame 230 is also shown in FIG. 2, but this frame contains no instruction or variable of particular interest in this example.

The separation in virtual memory between bases of consecutive frames is arranged to be substantially constant. It is required is that the if a program is created with frame base addresses P & D, and then if these frames are relocated by the operating system to addresses P' and D', then D−P must equal D'−P' In this example arrangement, the frame size is 4 kb, but it will be appreciated that the frame size can be selected from a plurality of different values. However, there is a constraint that granularity at which the program code and associated data may be relocated by the operation system should be an integral multiple of the frame size. This is to ensure that the relative addressing according to the present technique continues to be effective regardless of whether or not the program code is in fact relocated. The number of frame offset bits and hence the frame size is determined by the instruction encoding, i.e. the minimum number of bits in the offset or immediate fields of the ADD, LDR and STR instructions of FIGS. 8A, 8B, 9A and 9B. For example, the 12-bit offset of FIG. 4 results in a frame size of 4 kilobytes.

As shown in FIG. 2, a partial address result for the variable "X" corresponds to the base of "Frame D" 220 of virtual memory and is specified by a frame offset denoted "hi21" and contained within the encoding of ADRP instruction. This frame offset value identifies, relative to the adjusted value of the program counter corresponding to the base address of the frame containing the ADRP instruction 212, the base address of the frame of memory within which the address for the variable "X" is located. Thus execution of the ADRP instruction computes relative to the base address of frame P a partial address result corresponding to the base address of frame D. A further complementary program instruction of, for example, an ADD, LDR, or STR instruction provides within its encoding an intra-frame offset field denoted "lo12" in FIG. 2, which specifies the location within the frame 220 of the target variable "X". Thus a complete 33-bit offset obtained by a combination of the frame offset value hi21 and the intra-frame offset value lo12 is specified by executing two different instructions. In this arrangement, both the ADRP instruction and the further instruction e.g. an ADD instruction are instructions with a width of 32 bits.

Figure 3:
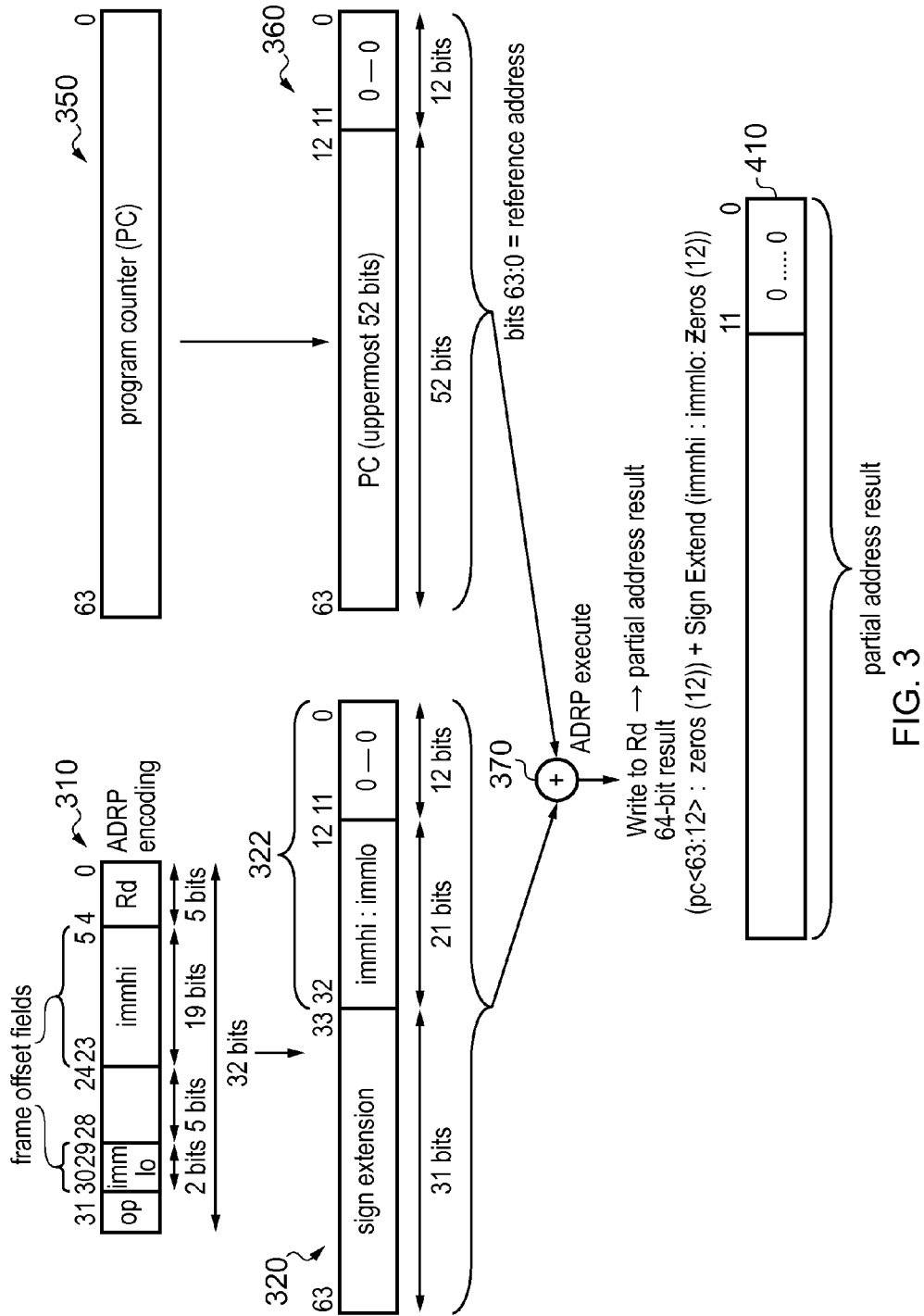
FIG. 3 schematically illustrates an address calculating operation used to calculate a partial address result corresponding to execution of the address calculating instruction according to the present technique.

FIG. 3 schematically illustrates an address calculating operation used to calculate a partial address result and corresponding to execution of the ADRP instruction according to the present technique. An encoding of the ADRP instruction is shown in element 310 of FIG. 3. As shown, the ADRP instruction is a 32-bit wide instruction in which the lowermost five bits i.e. ADRP [4:0] specify the destination register into which the result of execution of the ADRP instruction should be written. Bits [23:5] of the ADRP encoding is a 19-bit value labelled "immhi", which is a first frame offset field. A second frame offset field "immlo" are specified in bits [30:29] of the ADRP encoding. The first and second frame offset fields are combined (in this case concatenated) to form a 21-bit portion corresponding to a 33-bit frame offset value 322. As shown in FIG. 3, the remaining 12 bits of the frame offset value 322 are all zero bits. The 12 zero bits ensure that the base of frame D (see FIG. 2) is specified by the execution result of the ADRP instruction (i.e. the partial address result). Note also in FIG. 3 that there is more than one offset field (field "immhi" and field "immlo") in the ADRP instruction encoding but there is only one offset value once decoded. Thus in alternative implementations of the address calculating instruction there may one, two or more offset fields in the instruction in encoding but a single offset value once decoded. Bit 31 of the ADRP instruction encodes the type of operation specified by the instruction, which in this case is a PC-relative addressing instruction for calculating the address of the base of a 4 kilobyte memory frame relative to the program counter.

Data element 320 of FIG. 3 shows a result of decoding of the ADRP instruction 310 by the decoding circuitry 140 of FIG. 1. This 64-bit data element comprises a 33-bit frame offset value 322 and a 31-bit sign extension. During the decoding process the immhi field and the immlo field of the ADRP encoding 310 are concatenated to form bits [32:12] of the 64-bit value 320, effectively multiplying the concatenated offset fields by the frame size of 4 kilobytes. The uppermost 31 bits [63:33] of the 64-bit value 320 are then set to a copy of bit 32, producing a sign-extension of the offset value. The lowermost 12 bits [11:0] of the 64-bit value 320 are set to a reference value, which in this case is a string of twelve zero bits. The frame offset value 322 can be considered to be a partial offset value, which will be combined with a supplementary offset value upon execution of a further program instruction to form a full offset and to give a full address specifying a memory location of an information entity. In the FIG. 3 embodiment, the frame offset value 322 is sign-extended to generate a signed frame offset value. The frame offset value 322 can be considered to be a partial address result. Alternatively, the sign extended frame offset value 322 can be considered to be a partial address result.

Execution of the ADRP instruction also comprises taking the value stored in the 64-bit program counter register represented as 350 in FIG. 3 and zeroing the lowermost 12 bits of that 64-bit value. Zeroing the lowermost 12 bits effectively means that only the information in the uppermost 52-bits of the 64-bit program counter are retained. These uppermost 52 bits of the program counter specify the base of the frame of memory (see FIG. 2) addressed by the program counter. The lowermost twelve bits which are zeroed or set to some other reference value correspond to the intra-frame offset within the memory frame of the program counter corresponding to the ADRP instruction. Thus, the intermediate result 360 of zeroing the lowermost 12 bits of the value in the program counter 350 specifies the frame base address of "frame P" 220 (see FIG. 2) of virtual memory Element 370 of FIG. 3 shows circuitry for performing an addition operation that is performed upon execution of the ADRP instruction 310. The result of the addition is written to the destination register Rd and is obtained by adding the scaled and sign-extended frame offset fields of the ADRP encoding 310 to the 64-bit value 360 corresponding to the program counter (in which the lower most 12 bits have been zeroed). The result of this addition is a partial address result 410 that specifies the base of the memory frame containing the target variable "X" as shown in FIG. 2.

Figure 4:
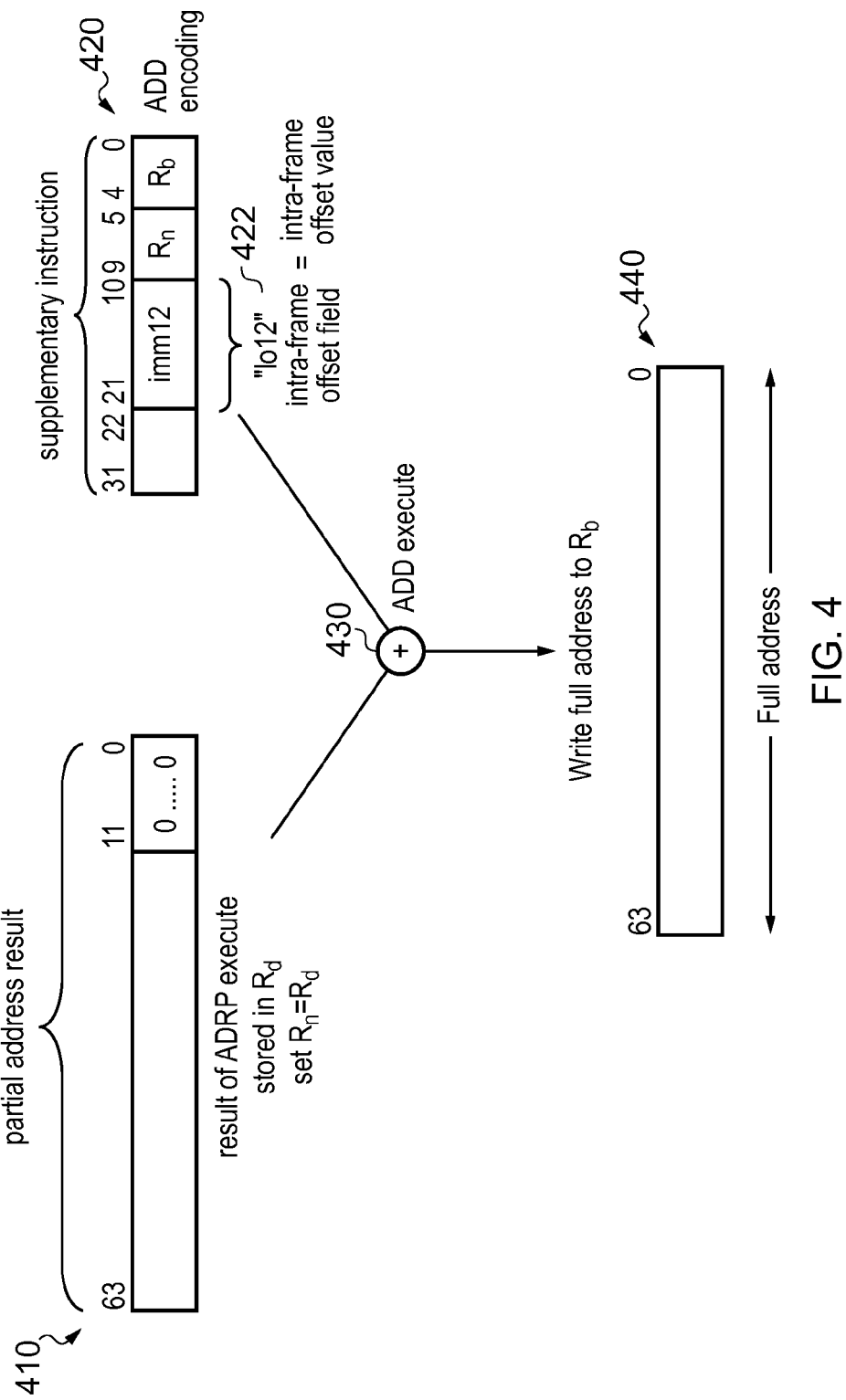
FIG. 4 schematically illustrates calculation of a full address value based on the result of the address calculating instruction execution illustrated by FIG. 3.

FIG. 4 schematically illustrates calculation of the full address value of the variable "X" of FIG. 2 based on the result of the ADRP execute 370 illustrated in FIG. 3. The 32-bit add encoding 420 comprises a 12-bit intra-frame offset field 422. As shown in FIG. 4, a 64-bit result 410 of the ADRP execute that was written to the destination register Rd in example of FIG. 3 is added by circuitry 430 to a 64-bit value constructed from a 32-bit wide ADD instruction 420 containing a 12-bit intra-frame offset value specified by the 12-bit intra-frame offset field i.e. bits [21:10] of the ADD encoding. Note that in this particular embodiment (FIG. 4) the intra-frame offset value is equal to the intra-frame offset field. By way of contrast, it can be seen from FIG. 3 that the frame offset value is constructed by scaling and sign extending two concatenated frame-offset fields (i.e. "immhi and "immlo") of the ADRP instruction. The frame offset field 322 of the address-generating instruction of FIG. 3 should be sign-extended to generate a signed frame offset value; but the intra-frame offset field 422 of FIG. 4 could be either sign or zero extended. In the FIG. 4 implementation it is zero extended. In general, the intra-frame offset value 422 (i.e. decoded intra-frame offset field 422) is not necessarily equal to the intra-frame offset field, it could also be scaled by a small amount. For example, in one instruction set architecture according to the present technique, to generate the intra-frame offset value, the intra-frame offset field is scaled by the size of the access, i.e. the 12-bit offset field is multiplied by 2 to generate a 13-bit offset value for a halfword (two byte) access, by 4 for a word (four byte) access, etc, though the extra high order bits are not exploited for this addressing mode (i.e. when used as the supplementary instruction in conjunction with ADRP) The result of executing the ADD instruction 420 is to produce a 64-bit result value 440 containing the full address corresponding to the variable "X" of FIG. 2.

Thus, referring back to FIG. 2, the result 440 of the add operation 430 specifies the exact location 222 of the variable "X" within the "frame D" 220 of virtual memory. Note that although in the example embodiment of FIG. 4 an ADD instruction has been used as the further (or supplementary) instruction for providing the lowermost twelve bits of the 64-bit offset, alternative instructions can be used for this purpose. For example a store instruction STR or a load instruction LDR utilising the base plus offset addressing mode could be used as an alternative to compute the full address and access that memory location with a single instruction. A previously known instruction such as an ADD instruction can be used as the supplementary instruction to calculate the full offset from the partial offset by setting a value encoded in a source register field of the ADD instruction to the destination register that stores the result of the execution of the ADRP instruction (address calculating instruction). Accordingly, a previously known ADD instruction can, according to the present technique be configured to specify as an input operand, a partial address result (i.e. result of executing the ADRP instruction of FIG. 3) in order to generate a full offset and a full address upon execution of the ADD instruction (supplementary instruction). Although previously known instructions can be configured as supplementary program instructions according to the present technique, in alternative embodiments, a new purpose-specific supplementary instruction could be deployed for calculation of the full offset given a partial address result generate by execution of the address calculating instruction according to the present technique.

Figure 5:
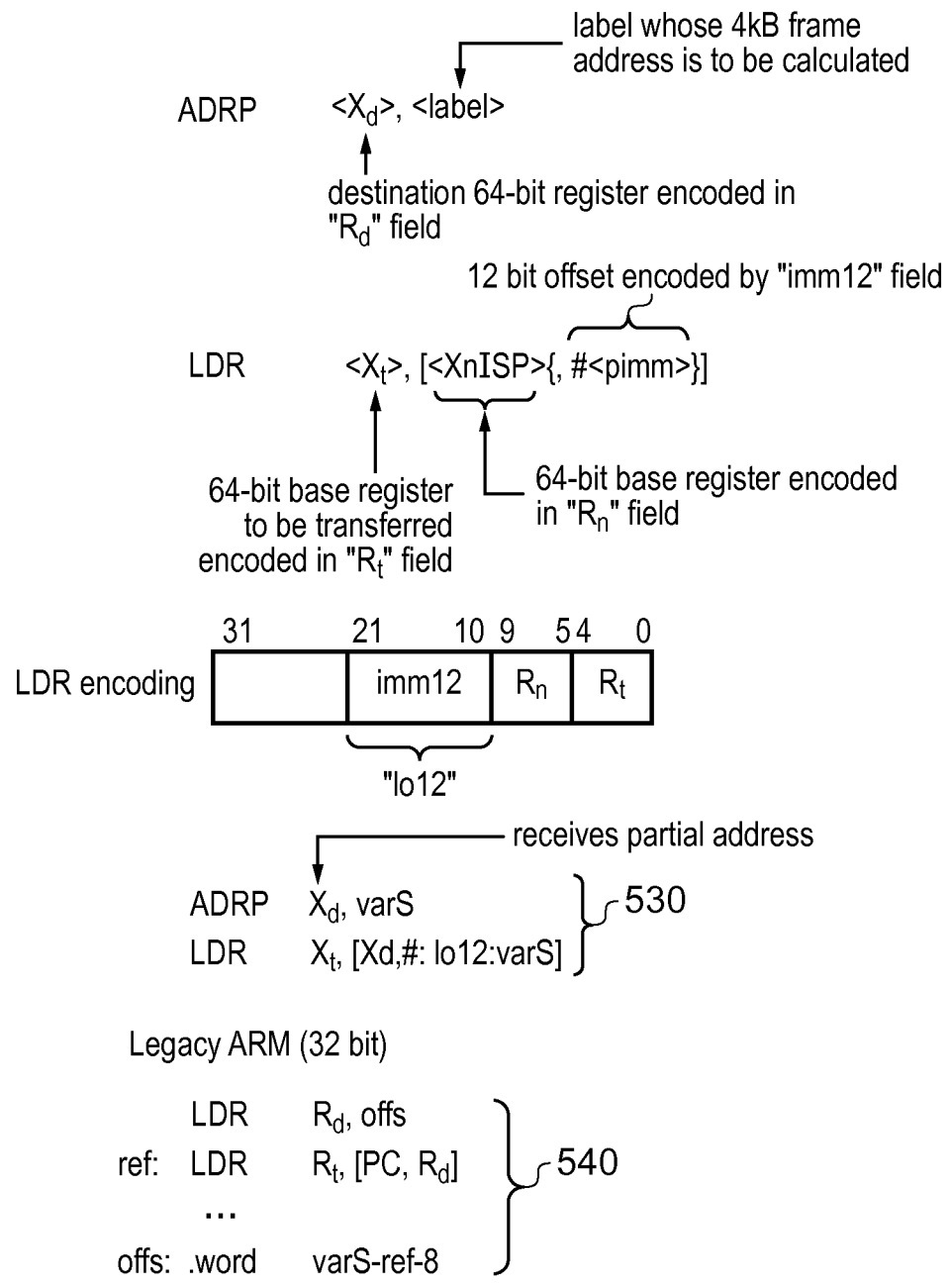
FIG. 5 schematically illustrates assembler syntax representations of the address calculating instruction according to the present technique and also assembler syntax representations of the at least one further instruction according to the present technique.

FIG. 5 schematically illustrates the assembler syntax representations of the ADRP instruction corresponding to the address calculating instruction of the present technique and also for the supplementary instruction, which in this case is shown as a LDR instruction. As shown, the ADRP instruction specifies a destination 64-bit register in which the partial address result will be stored after execution of the ADRP instruction and takes as a further argument, the "label" i.e. the name of the variable whose 4 kilobyte frame base address is to be calculated. The supplementary LDR instruction takes as a first argument a 64-bit destination register represented by "Xt" to be transferred and as a second argument, both a 64-bit base register and a 12-bit unsigned immediate value (i.e. the offset) corresponding to the lowermost twelve bits of the full address are specified.

Also shown in FIG. 5 is the fact that bits [21:10] of the LDR encoding contain the 12-bit intra-frame offset field. Instruction sequence 530 in FIG. 5 shows how executing an ADRP instruction followed by an LDR instruction that specifies (i) the destination register Xd of the ADRP instruction as its base register and (ii) the lowermost 12 bits corresponding to the intra-frame offset value, can be used in combination to calculate a full address and simultaneously load the data from that address into register Xt. Effectively the register Xd contains the reference address plus the uppermost 21 bits of the 33-bit frame offset, whilst the field "lo12" of the LDR instruction provides the lowermost 12 bits of the 33-bit offset.

By way of contrast, the instruction sequence 540 corresponds to legacy 32-bit ARM code which illustrates a previously known alternative way of specifying the full target memory address. This involves first loading an offset from a literal pool in memory using a first PC-relative LDR instruction and then adding that value retrieved from memory to the program counter to generate the full address via a second LDR instruction. During execution of a first LDR instruction of the sequence 540, if an attempt to access the offset results in a data cache miss, then the data processing apparatus will be required to access off-chip memory, which is likely to result in a pipeline stall. By way of contrast, the sequence of instructions 530 corresponding to the present technique specifies the offset entirely inline as parameters within the program instruction encodings of the combination of two program instructions ADRP and LDR. This avoids the dependency between the two load operations of the sequence of 540 and is likely to be more efficiently executed, and furthermore does not require extra memory in which to store the constant offset.

FIG. 6 schematically illustrates how the address calculating instruction and the supplementary instruction according to the present technique have the feature of separability and reusability, i.e. it is not necessary to execute the address calculating instruction and the supplementary instruction in immediate succession in order to retain the accuracy of the full address calculation. Example 1 of FIG. 6 shows how several different occurrences of the ADRP instruction in a single sequence of program code is permissible. On the left hand side of FIG. 6 it is shown that two distinct versions of the ADRP instruction, one in frame 610 having a first program counter "PC1" with an intra-frame offset of "off1" and one in frame 620 having a second different program counter "PC2" with an intra-frame offset of "off2".

Due to the fact that, as shown in FIG. 3, the lowermost 12 bits of the 64-bit sign extended version 320 of the 33-bit frame offset value 322 and the lowermost 12 bits of the partial address have the value zero, execution of each of the first ADRP instruction ADRP1 and the second ADRP instruction ADRP2 both give results corresponding to the base address of the frame 630 containing the target variable "varX". This is despite the fact that the intra-frame offset of the first program counter PC1 corresponding to the value "off1" in FIG. 6 differs from the intra-frame offset value of the ADRP2 instruction i.e. "off2" in FIG. 6. The full address of the variable "varX" is then accurately derived via providing the lower 12 bits of the full address by execution of the LDR instruction, which combines those 12 bits with the frame base address stored in the destination register written to by the instructions ADRP1 and ADRP2.

FIG. 6 also shows a second example denoted "Example 2", in which an instruction sequence is illustrated comprising a single ADRP instruction and two different further instructions that can be used to calculate the address of the same target variable varX. Following execution of the ADRP instruction, the value stored in the destination register Xd will correspond to the base of the frame 630 containing the target variable. Accordingly when the LDR instruction is executed, the 12-bit intra-frame offset value written as ":lo12:varX" will be added to the frame base address contained within the register Xd giving the full address of the variable varX.

A number of intervening instructions i.e. INSTRN P, INSTRN Q and INSTRN R are executed in this second example code sequence prior to execution of the STR instruction, which is the last of the six instructions in Example 2. This STR instruction also uses the results stored in the destination register Xd during execution of the first ADRP instruction and again combines the frame base address specified therein with the 12-bit intra-frame offset specified within the STR instruction itself. Both the LDR instruction and the STR instruction of Example 2 give an accurate full address for the variable varX in frame 630 of FIG. 3. Thus FIG. 6 illustrates that the address calculating instruction and the at least one further instruction according to the present technique are separable and also illustrates that there can be several occurrences of the address calculating instruction and supplementary instructions within the same sequence of program code (i.e. at different locations in the program code) without compromising the accuracy of the variable's address calculation. This provision of a separate address calculating instruction and supplementary instruction (LDR or STR) that together specify the full address inline within the program instructions themselves enables a compiler to split the high part and the low part of an offset value for relative addressing and to process the two components of the offset independently, permitting execution of the two different instructions at separate points in the program code.

It will be appreciated that although in the example embodiments a 33-bit offset is specified, the present technique could be used to specify an offset of any chosen size, the offset size being restricted only by the number of bits allocated within the address calculating instruction and the one or more further instruction(s) used to construct the full address. Similarly, although a single supplementary (further) instruction has been illustrated to provide the lowermost bits of the offset, it will be appreciated that according to the present technique, a plurality of further instructions could be used to provide different portions of the offset in combination with the partial address provided by the address calculating instruction.

FIG. 7 schematically illustrates full details of the PC-relative addressing instruction i.e. the address calculating instruction according to the present technique. Element 710 shows the instruction encoding and also shown are the operations performed during decoding and execution of this instruction. These operations are also schematically illustrated by FIG. 3 described above.

FIG. 8A schematically illustrates details of an add-subtract instruction that is one option for use as the at least one further instruction according to the present technique. An encoding 810 of the add instruction is shown together with appropriate assembler syntax and operands.

FIG. 8B schematically illustrates pseudo code for decoding an execution of the add-subtract instruction of FIG. 8A.

FIG. 9A schematically illustrates details of the load-store register instruction corresponding to a different option to that of FIGS. 8A and B for the at least one further instruction according to the present technique. Element 910 schematically illustrates an instruction encoding for the LDR or STR instructions with base plus offset addressing mode.

FIG. 9B shows assembler syntax corresponding to the LDR or STR instruction of FIG. 9A together with pseudo code for decoding of these load-store register instructions.

Figure 10:
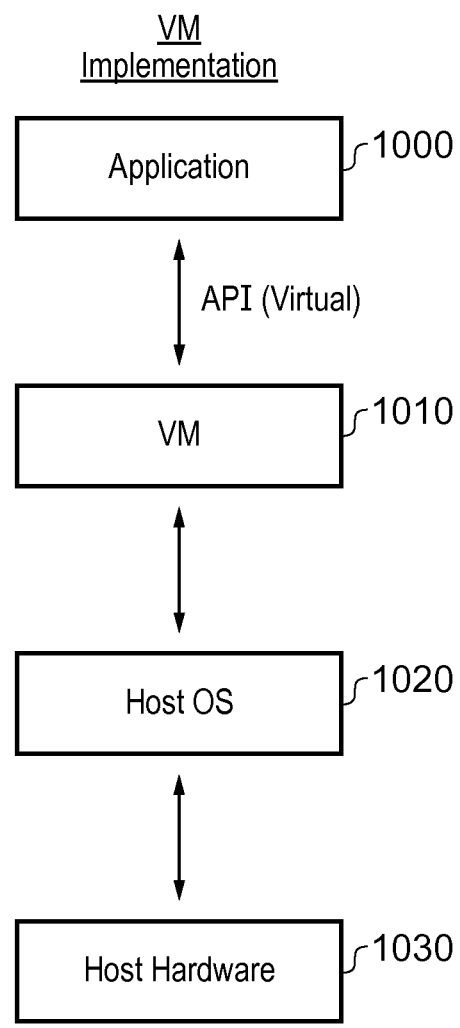
FIG. 10 schematically illustrates a virtual machine implementation of the present invention.

FIG. 10 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 1030 typically running a host operating system 1020 supporting a virtual machine program 1010. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 1010 is capable of executing an application program (or operating system) 1000 to give the same results as would be given by execution of the program by such a real hardware device. Thus, the program instructions, including the control of memory accesses described above, may be executed from within the application program 1000 using the virtual machine program 1010 to model their interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
    processing circuitry for processing data;
    an instruction decoder responsive to program instructions to generate control signals for controlling said processing circuitry to perform said data processing;
    wherein said program instructions comprise an address calculating instruction having an instruction size, said processing circuitry being responsive to said address calculating instruction to perform an address calculating operation for calculating a partial address result by adding a non-fixed reference address and a partial offset value, said partial address result specifying a portion of a full address specifying a memory location of an information entity, wherein said partial offset value has a bit-width greater than or equal to said instruction size and is encoded within at least one partial offset field of said address calculating instruction.

2. The data processing apparatus as claimed in claim 1, wherein said data processing apparatus has access to a virtual address space having a plurality of memory frames of predetermined frame size and wherein said partial offset value is a frame offset value specifying relative to said non-fixed reference address a frame base address for a frame containing said information entity.

3. The data processing apparatus as claimed in claim 2, wherein said partial offset value is obtained from said encoding in said at least one partial offset field and has a bit-width greater than a combined bit-width of said at least one partial offset field.

4. The data processing apparatus as claimed in claim 3, wherein said partial offset value comprises said encoding in said at least one partial offset field and a predetermined bit-width of zeros.

5. The data processing apparatus as claimed in claim 2, wherein said predetermined frame size corresponds to a number of bytes that is $2^F$ where F is the number of intra-frame offset bits and wherein said frame base address is at a predetermined offset within said frame.

6. The data processing apparatus as claimed in claim 5, wherein said address calculating operation comprises:
    (i) deriving said frame offset value from at least one field of said address calculating instruction encoding said partial offset value;
    (ii) generating said partial address result comprising said frame base address.

7. The data processing apparatus as claimed in claim 1, wherein said address calculating instruction has an instruction bit-width and said full address has a full address bit-width different from said instruction bit-width.

8. The data processing apparatus as claimed in claim 7, wherein said data processing apparatus has access to a virtual address space having a plurality of memory frames of predetermined frame size and wherein said partial offset value is a frame offset value specifying relative to said non-fixed reference address a frame base address for a frame containing said information entity and wherein said at least one frame offset field has a first bit-width and wherein said frame offset value has a second bit-width greater than said first bit-width.

9. The data processing apparatus as claimed in claim 8, wherein said frame offset value is generated by combining contents of said at least one frame offset field and performing a scaling operation depending upon said predetermined frame size.

10. The data processing apparatus as claimed in 9, wherein said full address bit-width is different from said second bit-width associated with said frame offset value.

11. The data processing apparatus as claimed in claim 7, wherein said total first bit-width is 21 bits and said third bit-width is 64 bits.

12. The data processing apparatus as claimed in claim 8, wherein said calculation of said partial address result comprises expanding said first bit-width to said second bit-width corresponding to said frame offset value by multiplying said at least one frame offset field by said frame size and expanding said second bit-width to said third bit-width corresponding to said full address by performing a sign extension.

13. The data processing apparatus as claimed in claim 3, wherein a bit portion of said partial address result corresponding in bit-position to said intra-frame offset bits of said full address is a multi-bit value having a numerical value of zero.

14. The data processing apparatus as claimed in claim 1, wherein said non-fixed reference address depends upon a program counter.

15. The data processing apparatus as claimed in claim 14, wherein said data processing apparatus has access to a virtual address space having a plurality of memory frames of predetermined frame size and wherein said partial offset value is a frame offset value specifying relative to said non-fixed reference address a frame base address for a frame containing said information entity and wherein said predetermined frame size corresponds to a number of bytes that is $2^F$ where F is the number of intra-frame offset bits and wherein said frame base address is at a predetermined offset within said frame and wherein said non-fixed reference address specifies a base address of a frame of memory addressed by said program counter.

16. The data processing apparatus as claimed in claim 15, wherein said non-fixed reference address is obtained by setting a predetermined number of least significant bits in said program counter to zero, said predetermined number depending upon said predetermined frame size.

17. The data processing apparatus according to claim 15, wherein a size of said frame of memory is set to be less than or equal to a minimum granularity at which a set of program code comprising said address calculating instruction and an associated information entity can be relocated by an operating system running on said data processing apparatus.

18. The data processing apparatus according to claim 17, wherein said data processing apparatus is configured to translate blocks of virtual addresses to physical addresses using a memory management unit, said blocks having a characteristic page size.

19. A virtual machine provided by a computer program executing upon a data processing apparatus, said virtual machine providing an instruction execution environment according to the data processing apparatus as claimed in claim 1.

20. A data processing method for performing data processing on a data processing apparatus, said method comprising:

in response to program instructions, generating control signals for controlling processing circuitry to perform said data processing;

in response to an address calculating instruction having an instruction size, performing an address calculating operation for calculating a partial address result by adding a non-fixed reference address and a partial offset value, said partial address result specifying a portion of a full address specifying a memory location of an information entity, wherein said partial offset value has a bit-width greater than or equal to said instruction size and is encoded within at least one partial offset field of said address calculating instruction.

21. A computer program product comprising a non-transitory storage medium storing a sequence of program instructions which, when run on a data processor, to control the data processor to perform the steps of the method according to claim 20.

* * * * *